United States Patent
Grimstad et al.

(10) Patent No.: US 10,160,662 B2
(45) Date of Patent: Dec. 25, 2018

(54) SUBSEA FLUID INJECTION SYSTEM

(71) Applicant: ONESUBSEA IP UK LIMITED, London, England (GB)

(72) Inventors: Per Gunnar Grimstad, Straumsgrend (NO); Åsmund Valland, Bønes (NO); Helge Dale, Rådal (NO)

(73) Assignee: OneSubsea IP UK Limited (GB)

( * ) Notice: Subject to any disclaimer, the term of this patent is extended or adjusted under 35 U.S.C. 154(b) by 0 days.

(21) Appl. No.: 15/138,850

(22) Filed: Apr. 26, 2016

(65) Prior Publication Data

US 2017/0267545 A1    Sep. 21, 2017

Related U.S. Application Data

(60) Provisional application No. 62/308,573, filed on Mar. 15, 2016.

(51) Int. Cl.
| | |
|---|---|
| *E21B 43/20* | (2006.01) |
| *C02F 1/00* | (2006.01) |
| *B01D 29/56* | (2006.01) |
| *B01D 29/66* | (2006.01) |
| *B01D 29/90* | (2006.01) |
| *B01D 61/14* | (2006.01) |
| *B01D 61/16* | (2006.01) |
| *B01D 65/02* | (2006.01) |
| *C02F 1/44* | (2006.01) |
| *B01D 61/00* | (2006.01) |
| *C02F 103/08* | (2006.01) |

(52) U.S. Cl.
CPC ............. *C02F 1/004* (2013.01); *B01D 29/56* (2013.01); *B01D 29/66* (2013.01); *B01D 29/90* (2013.01); *B01D 61/00* (2013.01); *B01D 61/147* (2013.01); *B01D 61/16* (2013.01); *B01D 65/02* (2013.01); *C02F 1/44* (2013.01); *E21B 43/20* (2013.01); *B01D 2201/08* (2013.01); *B01D 2311/04* (2013.01); *B01D 2321/04* (2013.01); *C02F 2103/08* (2013.01); *C02F 2201/002* (2013.01)

(58) Field of Classification Search
CPC . E21B 43/20; C02F 1/004; C02F 1/44; B01D 29/56; B01D 29/66; B01D 29/90; B01D 61/147; B01D 61/16; B01D 65/02
See application file for complete search history.

(56) References Cited

U.S. PATENT DOCUMENTS

| | | | |
|---|---|---|---|
| 6,171,483 B1 | 1/2001 | Eden et al. | |
| 9,464,516 B2 * | 10/2016 | Ayirala | E21B 43/20 |
| 9,470,080 B2 * | 10/2016 | Kommepalli | E21B 43/40 |

(Continued)

FOREIGN PATENT DOCUMENTS

| | | |
|---|---|---|
| CN | 102701504 B | 12/2013 |
| NO | 20150956 A1 | 7/2015 |

(Continued)

OTHER PUBLICATIONS

International Search Report and Written Opinion dated Jun. 26, 2017, for International Application No. PCT/EP2017/055859.

*Primary Examiner* — Matthew R Buck
(74) *Attorney, Agent, or Firm* — Conley Rose, P.C.

(57) ABSTRACT

A subsea system is configured to inject seawater into a subterranean formation. The system includes a sub-micron filtration module and a plurality of pumps and a plurality of other filtering devices arranged in series.

24 Claims, 6 Drawing Sheets

(56) References Cited

U.S. PATENT DOCUMENTS

| | | | | |
|---|---|---|---|---|
| 2005/0023222 | A1* | 2/2005 | Baillie | B01D 61/04 210/651 |
| 2005/0029192 | A1* | 2/2005 | Arnold | B01D 61/02 210/641 |
| 2006/0243670 | A1* | 11/2006 | Pinchin | C02F 1/688 210/748.11 |
| 2007/0090039 | A1* | 4/2007 | Young | B01D 61/04 210/321.6 |
| 2009/0057223 | A1* | 3/2009 | Young | A61F 15/02 210/636 |
| 2009/0217992 | A1* | 9/2009 | Wilson | E21B 43/01 137/565.01 |
| 2012/0205307 | A1* | 8/2012 | Boudinar | C02F 1/44 210/636 |
| 2014/0241907 | A1 | 8/2014 | Grynning et al. | |
| 2016/0304371 | A1* | 10/2016 | Wang | B01D 61/02 |
| 2016/0368800 | A1* | 12/2016 | Eriksen | B01D 61/022 |

FOREIGN PATENT DOCUMENTS

| | | | |
|---|---|---|---|
| WO | 2011053752 | A1 | 5/2011 |
| WO | 2014206919 | A1 | 12/2014 |
| WO | 2015/103017 | A1 | 7/2015 |
| WO | 2015/123736 | A1 | 8/2015 |
| WO | 2015138898 | A1 | 9/2015 |
| WO | 2017013027 | A1 | 1/2017 |

* cited by examiner

SUBSEA FLUID INJECTION SYSTEM

CROSS REFERENCE TO RELATED APPLICATIONS

This patent application claims the benefit of: U.S. Prov. Patent Application Ser. No. 62/308573 filed on Mar. 15, 2016 and entitled "Subsea Injection System," which is incorporated by reference herein.

TECHNICAL FIELD

The present disclosure relates to subsea injection systems and methods. More particularly, the present disclosure relates to subsea systems and methods for injecting fluid into a subterranean formation.

BACKGROUND

Recovery of hydrocarbons from an oil or gas field can be enhanced by injecting fluid, for example water, into the subterranean reservoir to maintain reservoir pressure and to drive certain fractions of the hydrocarbons to producing wells. Water flooding operations generally depend upon a sufficient supply of water for injection, means for treating the source water to meet the reservoir conditions, a pumping system and access to the formation via a wellbore.

In order to avoid large investments associated with construction and installation of surface arrangements offshore, subsea-placed production equipment is increasingly sought-after. The production stream is conveyed via pipelines to the shore or to existing remote surface structures, such as platforms.

Water injection for stimulating production from a petroleum reservoir involves pumping water at high pressure down into injection wells. The high pressure water is pumped into a reservoir or formation that is in fluid communication with the reservoir. The reservoir pressure can thereby be maintained and petroleum can be forced to migrate toward the production wells. In some applications, raw seawater is injected to increase recovery by pumping seawater into the field to force the hydrocarbons to flow towards the production wells.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, a subsea system for injecting seawater into a subterranean formation is described. The system includes: a sub-micron filter module configured to accept incoming seawater from an inlet, and using cross flow filtration to separate the incoming seawater into rejected seawater and sub-micron filtered seawater; an injection pump configured to accept the sub-micron filtered seawater and increase its pressure for purposes of injection into the subterranean formation via a wellbore penetrating therethrough; and an auxiliary pump configured to provide continuous flow of at least the rejected seawater through the sub-micron filter module.

According to some embodiments, the sub-micron filter module includes a plurality of filter elements arranged for cross flow filtration. The sub-micron filter module can be configured to remove sulfates from the incoming seawater, resulting in reduced sulfate concentrations in the sub-micron filtered seawater. According to some other embodiments, the sub-micron filter module can be configured to reduce dissolved salt in the incoming seawater resulting in reduced salinity in the sub-micron filtered seawater. In such cases, the filter elements can include reverse osmosis filter elements. According to some embodiments, the filter elements are mounted in series within a plurality of pressure casings arranged in parallel.

The auxiliary pump can be positioned downstream of the sub-micron filter module and connected to accept the rejected seawater. The injection pump and auxiliary pump can be driven by separate electric motors or, according to some embodiments, they can both be driven by the same electric motor. According to some embodiments, the auxiliary pump is positioned upstream from the sub-micron filter module and connected to feed the incoming seawater into the inlet of the sub-micron filter module. According to some other embodiments, the injection pump and auxiliary pump are lubricated and cooled with an environmental barrier fluid that is maintained at an overpressure with respect to the process fluid such that the barrier fluid leaks (or is consumed or used) at a predetermined rate. According to some other embodiments, the injection pump and/or the injection pump is partially and/or fully lubricated and cooled using seawater such as the sub-micron filtered seawater.

According to some embodiments, a particle strainer, a particle filter and/or a micro filter is/are positioned upstream of the sub-micron filter module. The particle filter can be configured to exclude particles greater than 100 microns and the micro filter can be configured to exclude particles greater than 1 micron, greater than 0.1 micron or greater than 0.01 micron. The particle and micro filters can be automatically cleaned using backflow driven by one or more ejectors mounted on a flow path of the rejected seawater.

According to some embodiments, a second injection pump can be positioned in series with and downstream of the injection pump. The second injection pump can be used to further increase pressure of the sub-micron filtered seawater for purposes of injecting it into subterranean formation via the wellbore.

According to some embodiments, a method for injecting seawater into a subterranean formation is described. The method includes: at a seabed location, continuously filtering incoming seawater with a sub-micron filter module using cross flow filtration thereby generating rejected seawater and sub-micron filtered seawater; pumping the sub-micron filtered seawater into an injection well penetrating the subterranean formation; and continuously flowing at least the rejected seawater through the sub-micron filter module using an auxiliary pump.

BRIEF DESCRIPTION OF THE DRAWINGS

The subject disclosure is further described in the following detailed description, and in the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
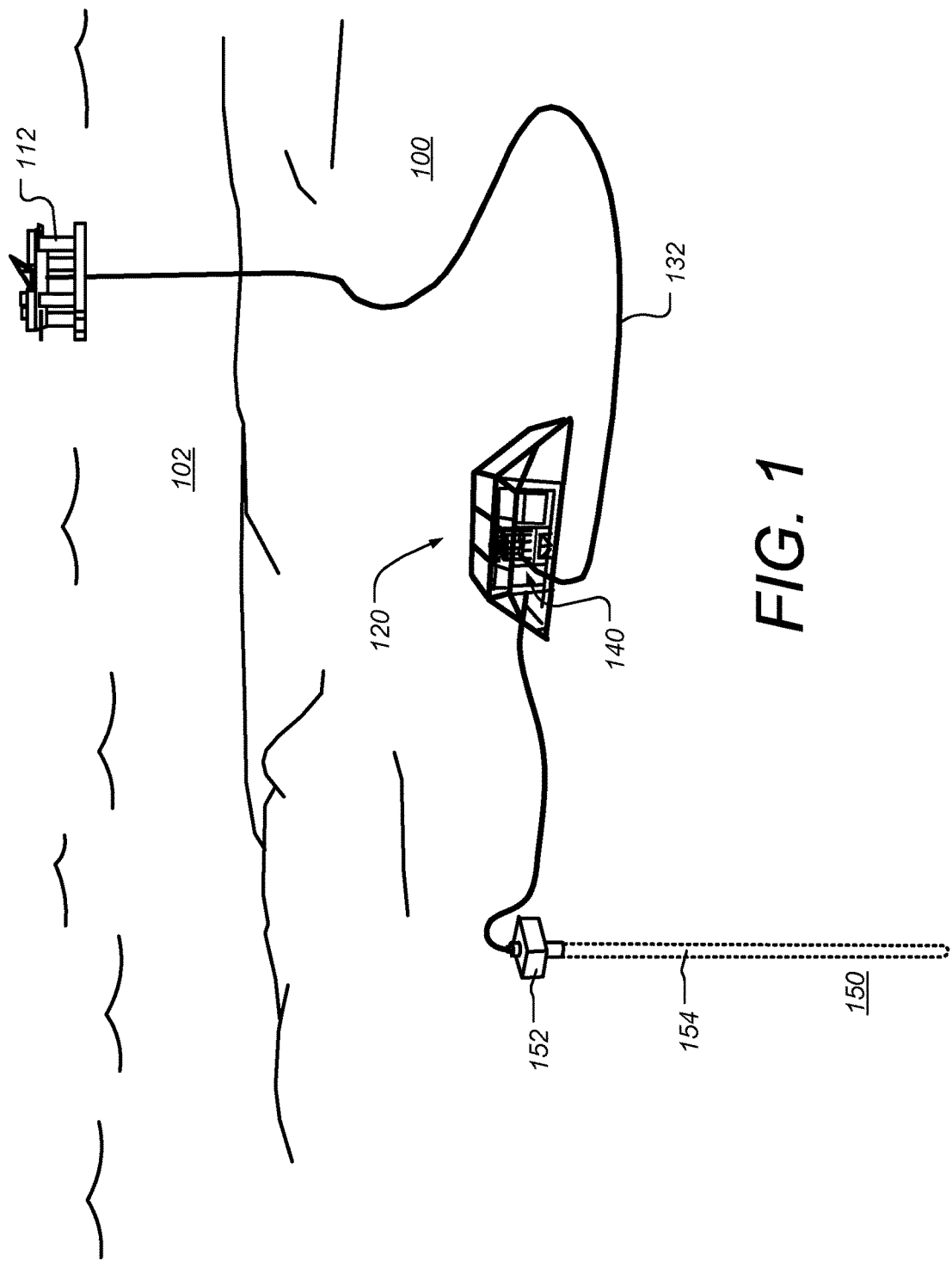
FIG. 1 is a schematic diagram illustrating a subsea environment in which a seawater injection system can be deployed, according to some embodiments.

One or more specific embodiments of the present disclosure will be described below. The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name, but not function.

According to some embodiments, injection of raw seawater is used to increase recovery of hydrocarbons from a subterranean formation by pumping seawater into the formation to force the hydrocarbons to flow towards the production wells. The increased pressure in the field will also stimulate production.

FIG. 1 is a diagram illustrating a subsea environment in which a seawater injection system can be deployed, according to some embodiments. On sea floor 100 a subsea station 120 is shown which is near wellhead 152 for injection well 154. Injection well 154 may be used to increase recovery of hydrocarbons from a subterranean formation 150, as well as to increase pressure in the field to further stimulate production. Station 120 includes a subsea water injection system 140, which is powered by one or more electric motors, such as permanent magnet motors. The station 120 is connected to an umbilical cable, such as umbilical 132, which supplied power to the electric motors in station 120. The umbilical in this case is being run from a platform 112 through seawater 102, along sea floor 100 to station 120. In other cases, the umbilicals may be run from some other surface facility such as a floating production, storage and offloading unit (FPSO), or a shore-based facility. According to some embodiments, umbilical 132 is also used to supply barrier fluid to station 120. The umbilical 132 can also be used to supply other fluids to station 120, as well as include control and data lines for use with the subsea equipment in station 120.

According to some embodiments, the subsea injection equipment is located at the seabed relatively close to the wellhead to lower costs and losses of the high pressure piping downstream of the pumps.

According to some embodiments, raw seawater is used for the injection. As the seawater is likely to contain impurities such as particles, algae, oxygen and sulfate, seawater injection system 140 may reduce these impurities to an acceptable level prior to injection. The water treatment will thus avoid blocking the filters and reducing injectivity of the reservoir.

Figure 2:
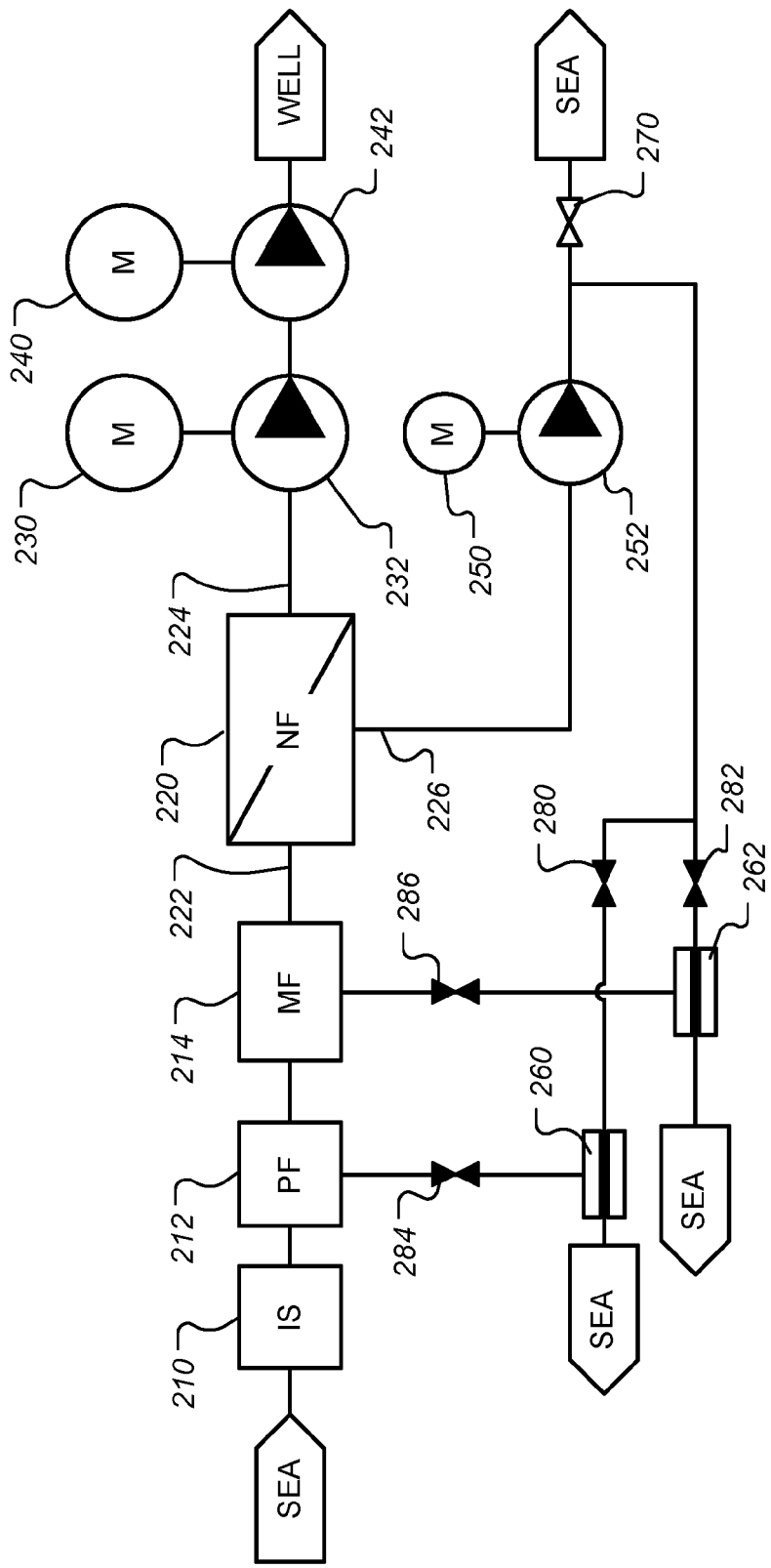
FIG. 2 is a schematic diagram of a seawater injection system, according to some embodiments.

FIG. 2 is a schematic diagram of a seawater injection system, according to some embodiments. The seawater injection system 140 includes an inlet strainer 210, a particle filter 212, a micro filter 214, a nano filter 220, two water injection pumps 232 and 242, and a reject flow pump 252. Electric motors 230, 240 and 250 are used to drive pumps 232, 242 and 252, respectively.

According to some embodiments, the inlet of the subsea injection system can include a coarse inlet strainer 210 that prevents larger objects entering the system. The inlet strainer 210 might be located well above the seabed for the same reason. According to some embodiments, the strainer 210 has many holes distributed over a large cone-shaped surface. According to some embodiment the holes are larger than 1 mm in diameter. According to some embodiments the holes may be about 15 mm, 12.5 mm or 10 mm in diameter, for example.

Downstream of the inlet strainer 210, particle filter 212 removes particles larger than 50-100 microns. According to some embodiments, particle filter 212 is self-cleaning to increase its life span. According to some embodiments, the cleaning is carried out by back flushing from the clean side of the particle filter 212 back to the sea. The back flow can be driven by ejector 260 that is positioned downstream of reject flow pump 252, or other pumps as previously explained. When cleaning of particle filter 212 is being performed in FIG. 2, for example, choke valve 270 is partially or fully closed and valves 280 and 284 are opened so as to draw water in the reverse direction through particle filter 212. According to some embodiments, only some of the filter elements might be cleaned at a time to avoid decreasing the flow rate through the filter module. According to some embodiments, the particle filter 212 is configured to be retrievable using a remotely operated underwater vehicle (ROV).

According to some embodiments, downstream of the particle filter 212, a micro filter 214 is provided to remove particles in the fluid to be injected greater than 0.01 micron. This enables reduced clogging of the reservoir and also protects the nano filter 220 from fouling. According to some embodiments, the micro filter 214 is also self-cleaning to increase its life span. The cleaning can be carried out by back flushing from the clean side of the micro filter to the sea. As in the case of the particle filter 212, the back flushing flow can be driven by ejector 262 that is positioned downstream of reject flow pump 252, or other pumps as previously explained. According to some embodiments, the micro filter 214 is made of up of multiple elements and only a subset of the micro filter elements are cleaned at a time to avoid decreasing the flow rate through the micro filter module. When cleaning of micro filter 214 is being performed in FIG. 2, for example, choke valve 270 is closed and valves 282 and 286 are opened so as to draw water in the reverse direction through some or all of the filter elements in micro filter 214. Note that valves 270, 280, 282, 284 and 286 are shown only to illustrate the cleaning principles, and there are many other valves and other elements included in the system 140 that are not shown for purposes of clarity. The micro filter module MF can also be configured to be ROV retrievable.

According to some embodiments, some subterranean formations might greatly benefit from injecting water having a very low sulfate level so as to prevent scaling. In the case seawater is used for the injection fluid, the sulfate content of the seawater is greatly reduced by use of a nano filter, such as nano filter 220 in FIG. 2. According to some embodiments, nano filter 220 is configured to remove particles greater than 0.01 micron in size. According to some embodiments, nano filter 220 is configured to remove particles greater than 5 nanometers in size. According to some embodiments, nano filter 220 is configured to remove particles greater than 1 nanometer in size. Nano filter 220 is shown with an inlet 222 and two outlets 224 and 224. Outlet 224 is the "permeate" water that has had its sulfate level greatly reduced. According to some embodiments, nano filter 220 includes multiple filter elements that are membrane type filters operating in a cross flow arrangement. Outlet 226 is the "reject" water that includes elevated levels of sulfate.

Figure 3A:
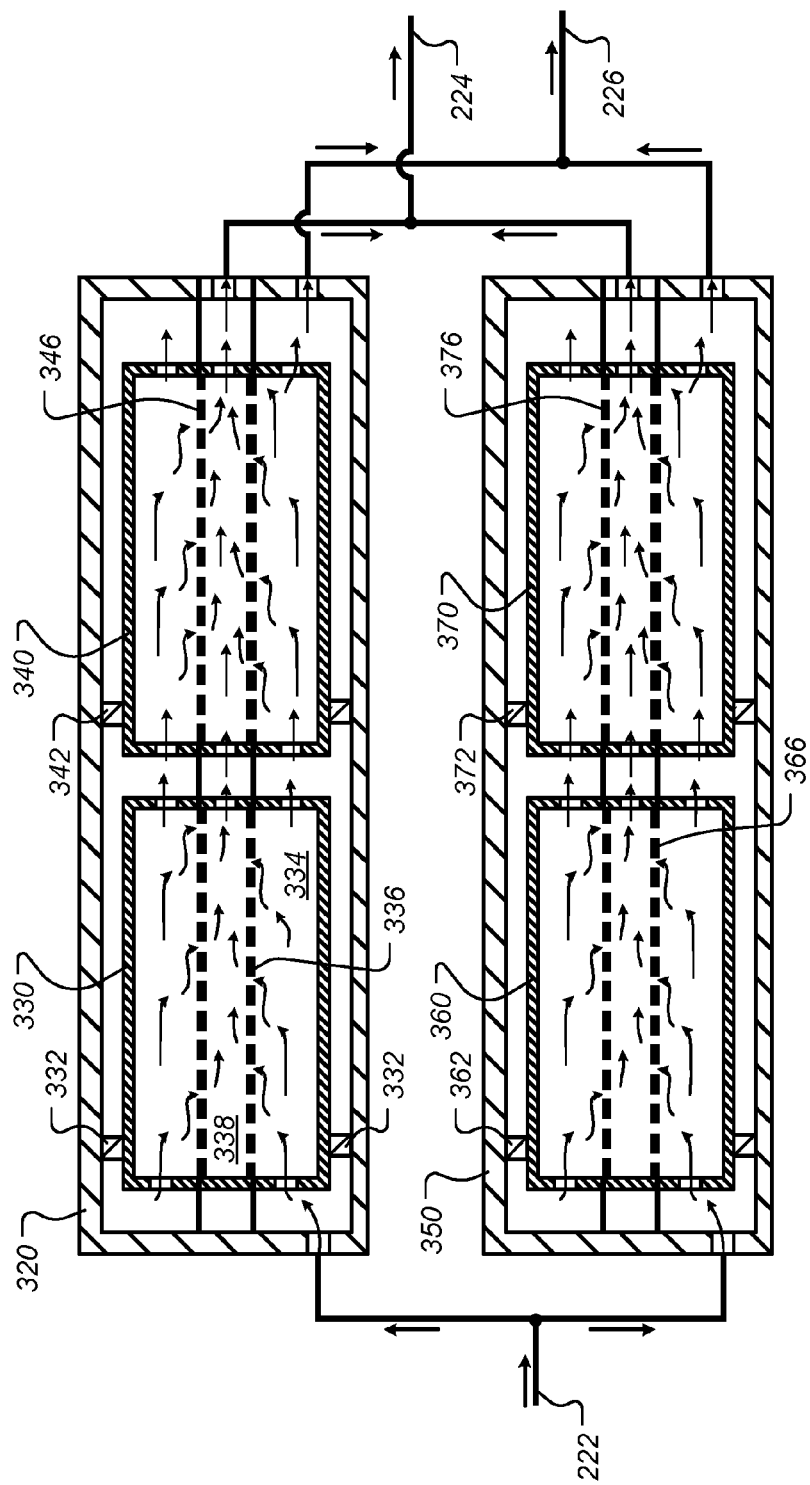
FIGS. 3A and 3B are schematic diagrams showing further details of a nano filter, according to some embodiments.
Figure 3B:
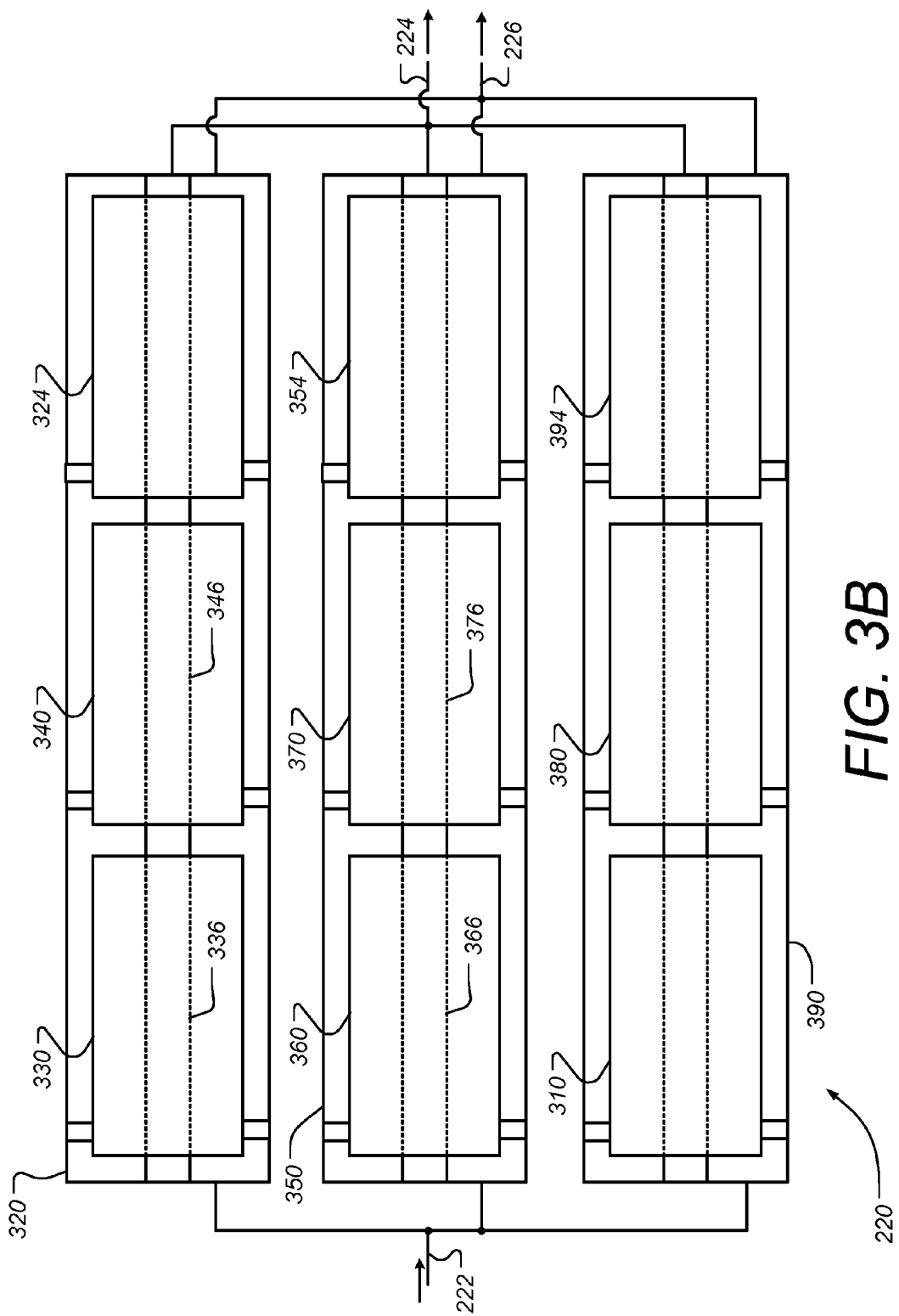

FIGS. 3A and 3B are diagrams showing further details of a nano filter, according to some embodiments. In FIG. 3A the filter 220 includes two pressure casings 320 and 350 arranged in parallel. Each of the housings is fed by inlet line 222. Within each pressure casing are two filter elements arranged in series. Filter elements 330 and 340 are positioned in series within casing 320, while filter elements 360 and 370 are positioned in series within casing 350. Although only two filter elements are shown in each pressure housing in FIG. 3A for purposes of clarity, in general a sufficient number of such filter casings can be connected to the filter module inlet in parallel to increase flow capacity. For example, FIG. 3B shows three casings in parallel, each with three elements in series. Other numbers of casings and elements can be used to achieve the desired flow capacity for the particular application.

Every filter element may have a seal towards the pressure casing to force the inlet water to pass all of the filter elements. In casing 320, seals 332 and 342 are formed between the casing and filter elements 330 and 340, respectively. Similarly, seals 362 and 372 are formed between casing 350 and filter elements 360 and 370, respectively. Within each filter element, one or more inner membranes are arranged to create a permeate flow path. In the filter element 330, membrane 336 create a permeate channel 338 within the main volume 334. Similarly, filter elements 340, 360 and 370 include membranes 346, 366 and 376, respectively, creating respective permeate channels within each filter element. Note that within each casing, the permeate flow paths are interconnected in series. According to some embodiments, other numbers of parallel permeate channels can be created within each filter element using membrane material. Although the membranes 336, 346, 366 and 376 are shown symbolically as a dashed line for purposes of clarity, in practice, the membranes can be made of various materials and have various structures, for example to increase surface area, including multiple layers and/or spiral windings membrane material. Various types of membrane material may be used, including for example: ceramic, polymer thin films, and/or etched films. According to some embodiments, the relative flow rates, pressures and design of the filter 220 are configured such that approximately half of the water passes through the membranes and enter the clean side of the filter and through the permeate line 224. The clean output or the permeate flow line 224, is coupled to one or two water injection pumps (two water injection pumps 232 and 242 are shown in the example of FIG. 2). According to some embodiments, a pressure drop across nano filter 220 up to approximately 50 bar is generated during operation from the inlet 222 to the clean outlet 224. The reject flow outlet 226 of the nano filter 220 has no significant pressure drop and will continuously dump approximately half of the flow through the nano filter 220 for which can be used for purposes such as cleaning the other filters, such as filters 212 and 214.

According to some embodiments, in cases where a reduced salt level is needed, the nano filter elements might be replaced by reverse osmosis membranes, or a combination of reverse osmosis membranes and nano filtration. According to some embodiments, if membranes 336, 346, 366 and 376 are reverse osmosis membranes, a pressure drop up to about 80 bar over may exist between inlet 222 and clean outlet 224. Throughout this specification, a reference to nano filtration can also refer to reverse osmosis filtration, according to some embodiments.

FIG. 3B shows an example where the nano (or osmosis) filter 220 includes three pressure casings 320, 350 and 390, arranged in parallel. Each pressure casing includes three filter elements in series, namely elements 330, 340 and 324 in casing 320; elements 360, 370 and 354 in casing 350; and elements 310, 380 and 394 in casing 390.

Referring again to FIG. 2, according to some embodiments, the nano (or osmosis) filter 220 is flushed continuously using reject flow pump 252. Pump 252 can also be used for cleaning the particle filter 212 and micro filter 214 by back flushing using ejectors 260 and 262, respectively. According to some embodiments, the water quality can be monitored on the inlet 222, outlet 224 and/or outlet 226 of the filter module 220 with conductivity probes (not shown). According to some embodiments, nano filter 220 is configured to be ROV retrievable.

According to some embodiments, one or more water injection pumps 232 and 242 are positioned downstream the clean side 222 of filter 220. These pumps 232 and 242 can be single phase pumps designed for the specific requirements of the injection well. The reject flow pump 252 can be a single phase pump with high capacity but lower head. The pumps can be configured to be ROV retrievable. According to some embodiments, the pumps 232, 242 and/or 252 and motors 230, 240 and/or 250 are configured to be at least partially cooled and lubricated by the process fluid (e.g. the seawater). According to some embodiments, the pumps 232, 242 and/or 252 may include "back to back" arrangements of impeller stages for offsetting longitudinal forces. For further details of process fluid cooling and lubrication and "back to back" impeller stage arrangements, see commonly owned and co-pending patent application entitled "Subsea Process Lubricated Water Injection Pump," U.S. patent application Ser. No. 15/138,921, filed on even date herewith, Publication No. US2017/306966, and which is incorporated by reference herein (hereinafter "the Co-Pending Application").

In the embodiments shown in FIG. 2, the injection system 140 includes inlet strainer 210, particle filter 212, micro filter 214 and nano filter 220, all upstream of two water injection pumps 232 and 242 which are connected to the injection well. The reject flow pump 252 is connected downstream of nano filter 220. The volumetric flow rate of the pump 252 is similar to that of pumps 232 and 242. Ejectors 260 and 262 for filter cleaning are located downstream of the pump 252. The sulfate rich water is discarded to sea in this example.

Figure 4:
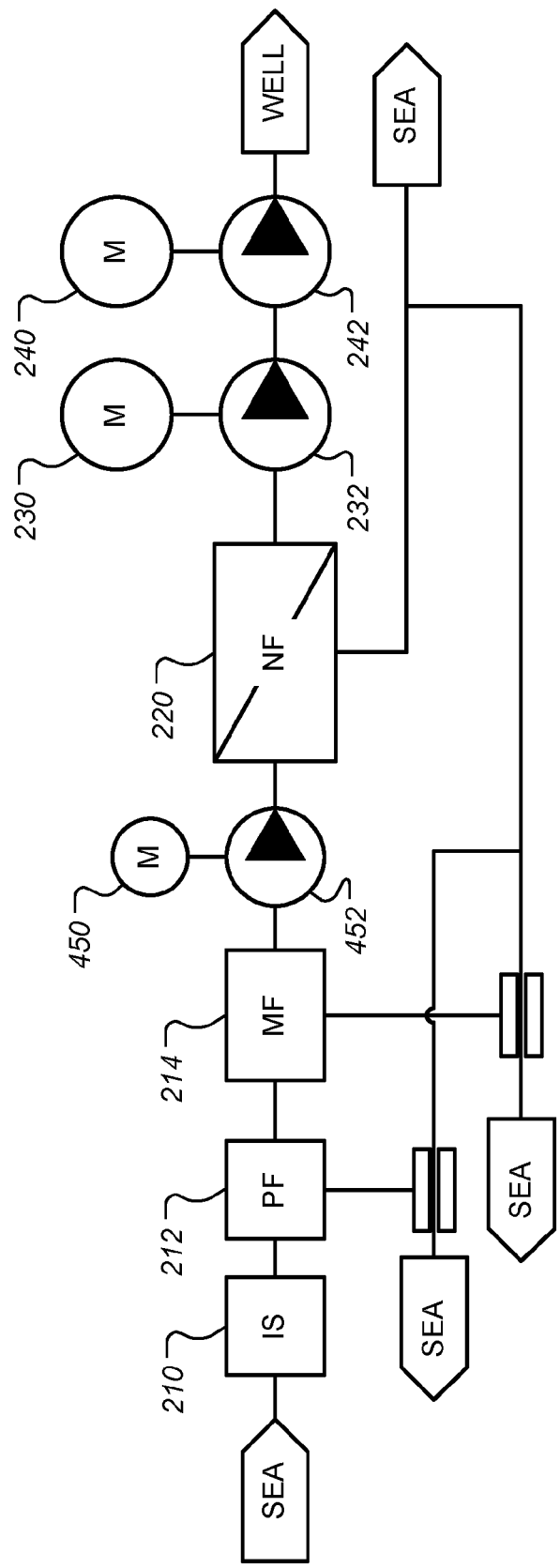
FIG. 4 is a schematic diagram of a seawater injection system, according to some other embodiments.

FIG. 4 is a schematic diagram of a seawater injection system, according to some other embodiments. FIG. 4 illustrates an alternative arrangement in which the same filter components and water injection pumps are used as shown in FIG. 2, but wherein the reject flow pump positioned downstream of the nano filter NF is replaced by a feed pump 452, driven by electric motor 450, upstream of nano filter 220. According to some embodiments, feed pump 452 is process-fluid lubricated, which is described in greater detail in the Co-Pending Application. Avoiding barrier fluid in feed pump 452 prevents it from entering the nano filter 220. The flow rate of feed pump 452 may be more than for example twice that of the reject flow pump 252 of FIG. 2. Locating the feed pump 452 upstream of nano filter 220 provides greater flexibility in deployment of the injection system, especially with respect to shallow water deployments. Since there is a significant pressure drop across nano filter 220, in shallow water deployments there may not be adequate water pressure available without a feed pump upstream of the nano filter. For example, in the cases where a 50 bar pressure drop is expected across the nano filter 220, using a feed pump as in FIG. 4 allows for deployments in waters of 500 meters or shallower. Furthermore, surface testing of the injection system is simpler since compensating for the pressure drop over the nano filter is more straightforward with upstream feed pump. According to some embodiments, the suction pressure of pump 232 might be kept constant with the arrangement shown in FIG. 4. When using a barrier-fluid-free feed pump in the arrangement of FIG. 4, there is an absence of any barrier fluid being emitted to the sea. According to some embodiments, conventional barrier fluid can be replaced by biodegradable oil based control fluid with minimum toxicity and bioaccumulation.

Figure 5:
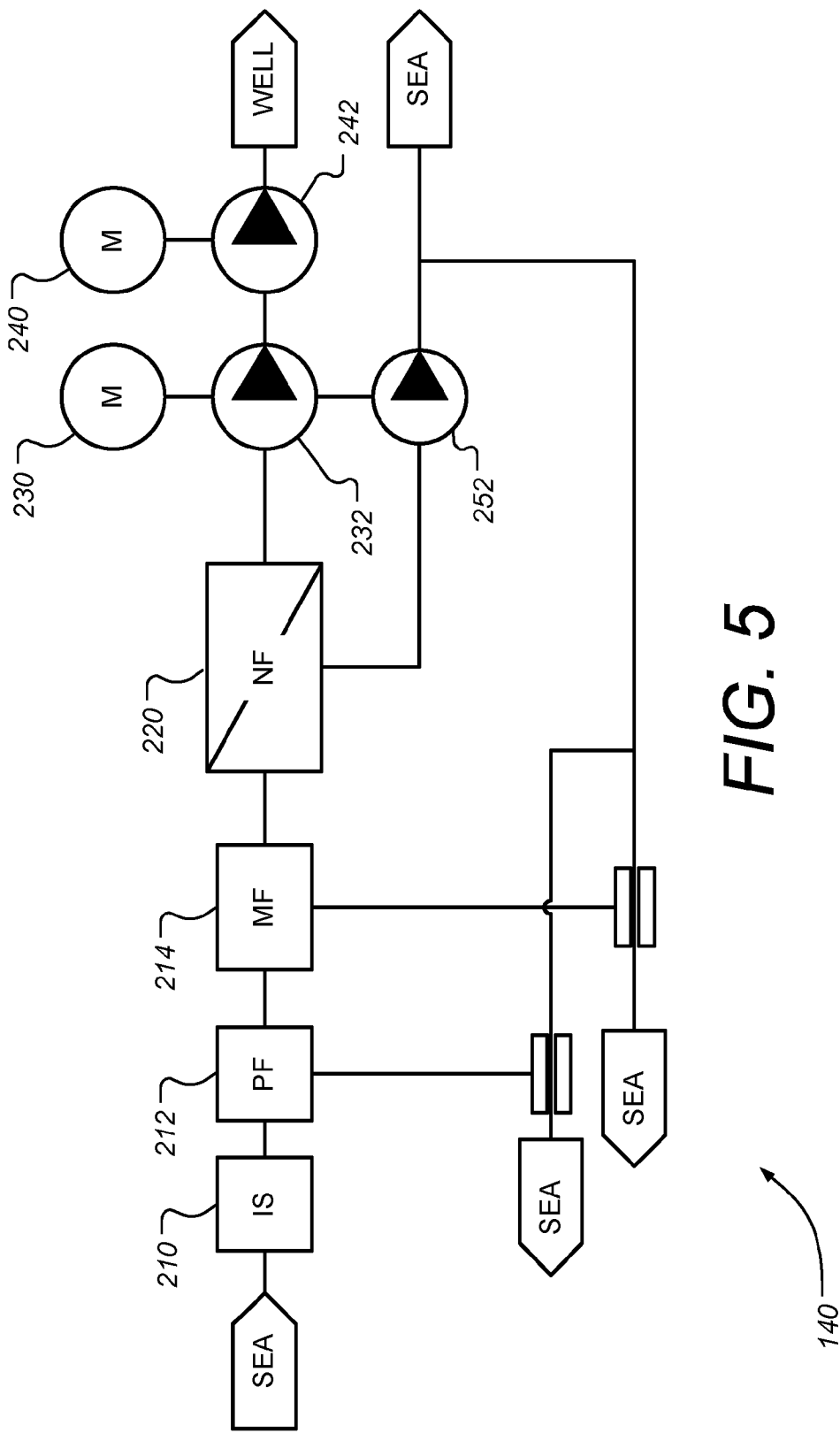
FIG. 5 is a schematic diagram of a seawater injection system, according to some other embodiments.

FIG. 5 is a schematic diagram of a seawater injection system, according to some other embodiments. FIG. 5 illustrates an alternative arrangement in which the same filter components and water injection pumps are used as shown in FIG. 2, but wherein the reject flow pump 252 downstream of the nano filter 220 is implemented as part of the water injection pump 232. In particular, the two pumps 232 and 252 share a common electric motor 230. According to some embodiments, the two pump sections 232 and 252 can be implemented in a "back to back" arrangement as described in further detail in the Co-Pending Application.

According to some embodiments, chemical injection can also be provided upstream of the filtering devices (212 and 214) and/or the water injection pumps 232 and 242, as needed depending on the underground formation requirements and desired water quality. Known chemicals, including but not limited to organic biocide, bio dispersant/ surfactant, scale inhibitors, calcium nitrate, oxygen scavenger, surfactant EOR, polymer inhibitor or microbial EOR, might be thus added in the injection system.

According to some embodiments, an all-electric control system can be used to control the subsea injection system, thereby enabling increased responsiveness in action/reaction of the various system equipment.

According to some embodiments, some or all of the pumps might be located topside while the filtration devices might be located subsea. In embodiments, some or all of the filtration devices might be located topside while the pumps might be located subsea.

While the subject disclosure is described through the above embodiments, it will be understood by those of ordinary skill in the art that modification to and variation of the illustrated embodiments may be made without departing from the inventive concepts herein disclosed. Moreover, while some embodiments are described in connection with various illustrative structures, one skilled in the art will recognize that the system may be embodied using a variety of specific structures.

What is claimed is:

1. A subsea system for injecting seawater into a subterranean formation comprising:
   a sub-micron filter module configured to accept incoming seawater from an inlet and use cross flow filtration to separate the incoming seawater into rejected seawater and sub-micron filtered seawater;
   an injection pump configured to accept the sub-micron filtered seawater and increase a pressure of the sub-micron filtered seawater for injection into the subterranean formation via a wellbore penetrating therethrough; and
   an auxiliary pump having an inlet connected to accept the rejected seawater and an outlet connected to a valve, the auxiliary pump configured to provide continuous flow of at least the rejected seawater through the sub-micron filter module,
   wherein the valve is configured to provide a selectable first flow path for the rejected seawater to the sea, and a selectable second flow path for the rejected seawater to cause a backflow to backflush a second filter positioned upstream of the sub-micron filter module.

2. The system according to claim 1 wherein the sub-micron filter module comprises a plurality of filter elements arranged for the cross flow filtration.

3. The system according to claim 2 wherein the sub-micron filter module is configured to remove sulfates from the incoming seawater to reduce sulfate concentrations in the sub-micron filtered seawater.

4. The system according to claim 2 wherein the sub-micron filter module is configured to reduce dissolved salt in the incoming seawater to reduce salinity in the sub-micron filtered seawater.

5. The system according to claim 4 wherein the plurality of filter elements are reverse osmosis filter elements.

6. The system according to claim 2 wherein the plurality of filter elements are mounted within a plurality of pressure casings arranged in parallel.

7. The system according to claim 6 wherein each of the plurality of pressure casings includes a plurality of filter elements arranged in series.

8. The system according to claim 1 wherein the auxiliary pump is positioned downstream of the sub-micron filter module.

9. The system according to claim 8 wherein the injection pump is driven by a first electric motor and the auxiliary pump is driven by a second electric motor.

10. The system according to claim 8 wherein the injection pump and the auxiliary pump are driven by a first electric motor.

11. The system according to claim 1 wherein the auxiliary pump is at least partially lubricated and cooled using seawater.

12. The system according to claim 1 wherein the injection pump is at least partially lubricated and cooled using the sub-micron filtered seawater.

13. The system according to claim 1 further comprising a particle strainer positioned upstream of the sub-micron filter module and connected to block particles from entering the inlet of the sub-micron filter module.

14. The system according to claim 1 wherein the second filter is a particle filter positioned upstream of the sub-micron filter module and connected and configured to exclude particles greater than 100 microns from entering the inlet of the sub-micron filter module.

15. The system according to claim 14 further including an ejector mounted on the second flow path to cause the backflow to backflush the particle filter.

16. The system according to claim 1 wherein the second filter is a micro filter positioned upstream of the sub-micron filter module and connected and configured to exclude particles greater than 1 micron from entering the inlet of the sub-micron filter module.

17. The system according to claim 16 wherein the micro filter is configured to exclude particles greater than 0.01 micron from entering the inlet of the sub-micron filter module.

18. The system according to claim 16 further including an ejector mounted on the second flow path to cause the backflow to backflush the micro filter.

19. The system according to claim 1 further comprising a second injection pump positioned in series with and downstream of the injection pump, the second injection pump configured to further increase pressure of the sub-micron filtered seawater for injection into the subterranean formation via the wellbore.

20. The system according to claim 1 wherein the sub-micron filter module, the injection pump and the auxiliary pump are configured to be deployed on a seabed.

21. A method for injecting seawater into a subterranean formation comprising:
at a seabed location, continuously filtering incoming seawater with a sub-micron filter module using cross flow filtration thereby generating rejected seawater and sub-micron filtered seawater;
pumping the sub-micron filtered seawater into an injection well penetrating the subterranean formation; and
continuously flowing at least the rejected seawater through the sub-micron filter module using an auxiliary pump having an inlet connected to accept the rejected seawater and an outlet connected to a valve,
wherein the valve is configured to provide a selectable first flow path for the rejected seawater to the sea, and a selectable second flow path for the rejected seawater to cause a backflow to backflush a second filter positioned upstream of the sub-micron filter module.

22. The method according to claim 21 wherein the auxiliary pump is positioned downstream of the sub-micron filter module.

23. The method according to claim 21 further comprising:
straining raw seawater using a particle strainer thereby excluding debris and particles greater than 15 millimeters from passing the strainer;
filtering the seawater passing the strainer using a particle filter module thereby excluding particles greater than 100 microns from passing the particle filter module; and
micro-filtering the seawater passing the particle filter module using a micro filter module thereby excluding particles greater than 1 micron from passing the micro filter module and entering the sub-micron filter module,
wherein the second filter is at least one of the particle filter module and the micro filter module.

24. The method according to claim 23 wherein the backflow is driven by one or more ejectors mounted on the second flow path.

* * * * *